United States Patent [19]
Sumner et al.

[11] Patent Number: 6,094,327
[45] Date of Patent: *Jul. 25, 2000

[54] DISK DRIVE CARTRIDGE DOOR

[75] Inventors: Wayne A. Sumner, Ogden; Allen T. Bracken, Layton; David W. Griffith, Layton; David E. Jones, Layton; Edward L. Rich, Ogden, all of Utah

[73] Assignee: Iomega Corporation, Roy, Utah

[*] Notice: This patent is subject to a terminal disclaimer.

[21] Appl. No.: 09/196,923

[22] Filed: Nov. 19, 1998

Related U.S. Application Data

[63] Continuation of application No. 09/066,149, Apr. 24, 1998, Pat. No. 5,856,901, which is a continuation of application No. 08/834,256, Apr. 15, 1997, Pat. No. 5,768,074, which is a continuation of application No. 08/550,911, Oct. 31, 1995, Pat. No. 5,679,109, which is a continuation-in-part of application No. 08/482,010, Jun. 7, 1995, Pat. No. 5,570,252.

[51] Int. Cl.⁷ .................................................. G11B 23/03
[52] U.S. Cl. ............................................................ 360/133
[58] Field of Search ............................ 360/133; 369/291

[56] References Cited

U.S. PATENT DOCUMENTS

| | | | |
|---|---|---|---|
| 3,854,784 | 12/1974 | Hunt et al. | 312/319 |
| 4,045,821 | 8/1977 | Fujikura | 360/132 |
| 4,320,430 | 3/1982 | Vogt | 360/133 |
| 4,400,748 | 8/1983 | Bauck et al. | 360/99.02 |
| 4,459,628 | 7/1984 | Barton | 360/133 |
| 4,532,564 | 7/1985 | Larson et al. | 360/97 |
| 4,550,354 | 10/1985 | Wakabayashi et al. | 360/133 |
| 4,559,575 | 12/1985 | Noto et al. | 360/133 |
| 4,608,617 | 8/1986 | Oishi et al. | 360/133 |
| 4,864,452 | 9/1989 | Thompson et al. | 360/133 |
| 4,879,621 | 11/1989 | Chamberlin et al. | 360/133 |
| 4,901,173 | 2/1990 | Jones et al. | 360/99.04 |
| 5,216,558 | 6/1993 | Griffith et al. | 360/99.06 |
| 5,381,402 | 1/1995 | Lee et al. | 360/291 |
| 5,440,436 | 8/1995 | Iftikar et al. | 360/99.12 |
| 5,444,586 | 8/1995 | Iftikar et al. | 360/99.12 |
| 5,481,420 | 1/1996 | Cardona et al. | 360/133 X |
| 5,515,358 | 5/1996 | Goto | 360/133 X |
| 5,537,281 | 7/1996 | Ma et al. | 360/133 |
| 5,570,252 | 10/1996 | Sumner et al. | 360/133 |
| 5,671,109 | 9/1997 | Sumner et al. | 360/133 |
| 5,768,074 | 6/1998 | Sumner et al. | 360/133 |
| 5,856,901 | 1/1999 | Sumner et al. | 360/133 |

*Primary Examiner*—Brian E. Miller
*Attorney, Agent, or Firm*—Woodcock Washburn Kurtz Mackiewicz & Kurtz LLP

[57] ABSTRACT

A cartridge for a magnetic disk drive has a rigid shell and a flexible door which covers an opening through which read/write heads engage the recording medium. The flexible door is guided outside of the shell to an open position as the cartridge is inserted into the drive. A projection on a flexible arm in the drive catches a hole in the flexible door to open it as the cartridge is inserted into the drive. The door along the outside of the cartridge conserves space so that the recording medium can be large for a given form factor drive.

42 Claims, 11 Drawing Sheets

DISK DRIVE CARTRIDGE DOOR

RELATED APPLICATION

This Application is a continuation application Ser. No. 09/066,149 filed Apr. 24, 1998 U.S. Pat. No. 5,856,901 which is continuation of Ser. No. 08/834,256 filed Apr. 15, 1997, now U.S. Pat. No. 5,768,074, which is a continuation of Ser. No. 08/550,911 filed Oct. 31, 1995, now U.S. Pat. No. 5,679,109, which in turn is a continuation-in-part of application Ser. No. 08/482,010 filed Jun. 7, 1995, now U.S. Pat. No. 5,570,252 issued.

BACKGROUND OF THE INVENTION

This invention relates to data storage drives and more particularly, to a removable cartridge for magnetic disk drives.

Magnetic disk drives which write and read digital data from flexible magnetic disks have been extensively used. "Floppy disk drives" have been extensively used for small, so-called microcomputer systems, for word-processing applications and the like. The flexible disk cartridge includes a relatively thin, flexible jacket which is inserted into the floppy disk drive.

Rigid disk drives, such as the IBM 3350, usually have a fixed rigid magnetic media. The magnetic heads do not contact the magnetic surface, but ride on a thin film of air. Because of this, and other features, these disk drives are capable of extremely precise and high speed operation. This type of disk drive is commonly referred to as a "Winchester" drive. Rigid disks enclosed in a rigid, removable cartridge, or shell have also been used. U.S. Pat. No. 4,864,452-Thompson, et al is an example of such a drive.

"Bernoulli" disk drives having performance characteristics similar to that of Winchester drives, but with removable cartridges, have been developed. A flexible magnetic disk is enclosed in a rigid box which is normally completely closed. U.S. Pat. No. 4,400,748-Bauck, et al and related patents to the common assignee show such drives using Bernoulli stabilized flexible disks. U.S. Pat. No. 4,901,173-Jones et al and related patents to a common assignee, show improvements which relate to so-called "half height" drives.

The cartridges for these drives have a door which closes the cartridge when it is removed from the drive. This prevents debris from contaminating the magnetic recording medium when the cartridge is not in the drive. When the cartridge is inserted into the drive, this door slides to an open position to provide access for the magnetic recording heads to engage the recording medium.

U.S. Pat. No. 5,216,558-Griffith, et al shows a drive for a rigid cartridge in which the cartridge door slides to an open position inside of the cartridge. In the aforementioned Thompson, et al patent, the door also slides to an open position inside the cartridge. In these drives, and in the cartridges used therein, space is at a premium. The cartridge has a narrow width into which the door must fit. This width is constrained by the relative size of the disk drive form factor. Also, the size of the disk relative to size of the casing severely limits the amount of room which is available inside the cartridge. It is desirable to have the disk occupy as much space within the cartridge as possible. This provides the maximum data storage capacity for a given drive form factor.

It is an object of the present invention to provide a cartridge with a sliding door which optimizes the amount of space available for the recording medium for a given form factor drive.

SUMMARY OF THE INVENTION

In accordance with the present invention, a thin, flexible door slides in narrow parallel tracks in the two halves of the cartridge shell. The door travels in tracks which guide the door outside of the cartridge parallel to the side of the cartridge when it is inserted into the drive. This exposes the disks in the cartridge to read/write head access.

A small projection on the end of a flexible arm catches the cartridge door, which is initially in its closed position, and pulls it out and along side the cartridge into the open position as the cartridge is inserted into the drive. The flexible arm insures that the projection will catch the cartridge door no matter where the cartridge is located in the drive opening. Special curved surfaces around the small projection control its penetration into a groove along the cartridge side.

The narrow space constraint into which the door must fit is caused by the relative size of the drive form factor and the disk size in the cartridge. Because the door slides outside of the cartridge, space inside of the cartridge is conserved.

The foregoing and other features, advantages and objects of the invention will be better understood from the following more detailed description and appended claims.

DESCRIPTION OF THE PREFERRED EMBODIMENT

FIGS. 1–5 show a cartridge having two halves 11 and 12 joined together at

Figure 1:
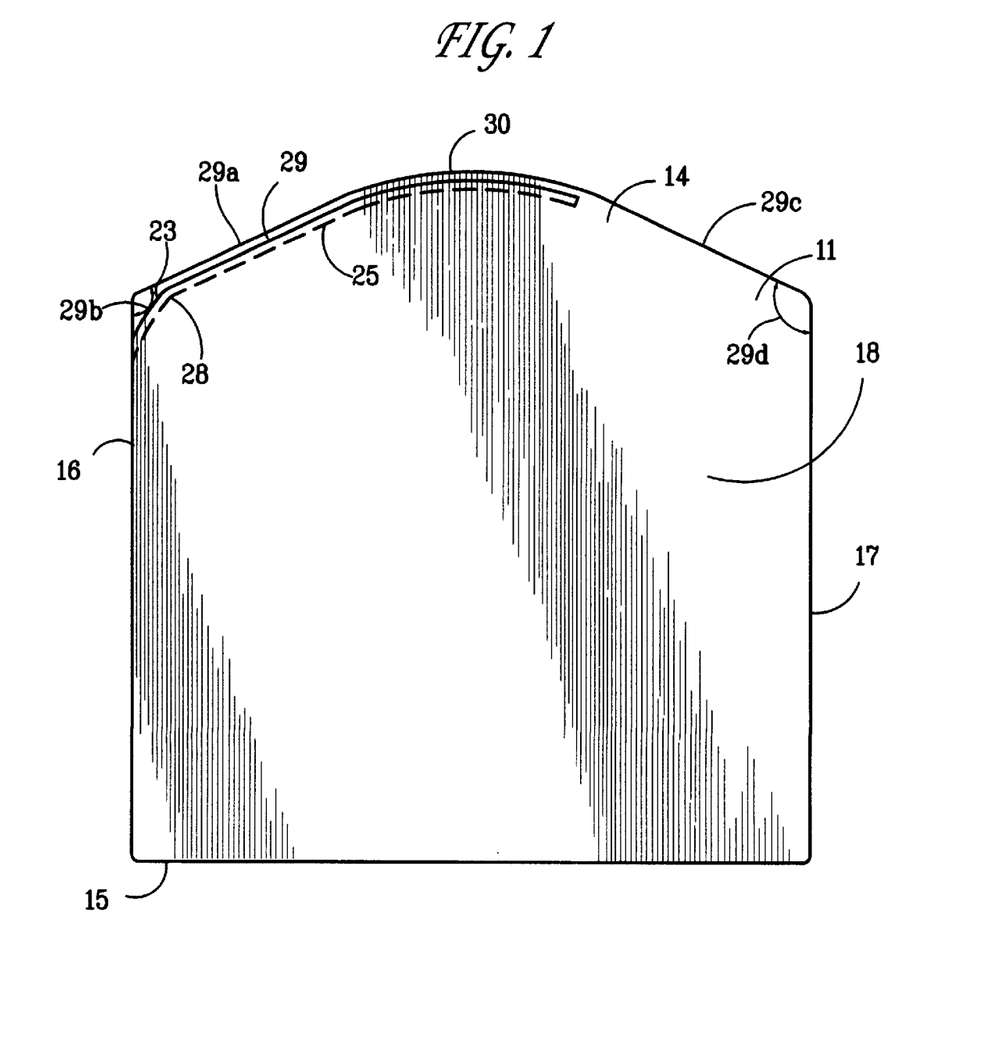
FIG. 1 shows a top view of the cartridge of the present invention.
Figure 2:
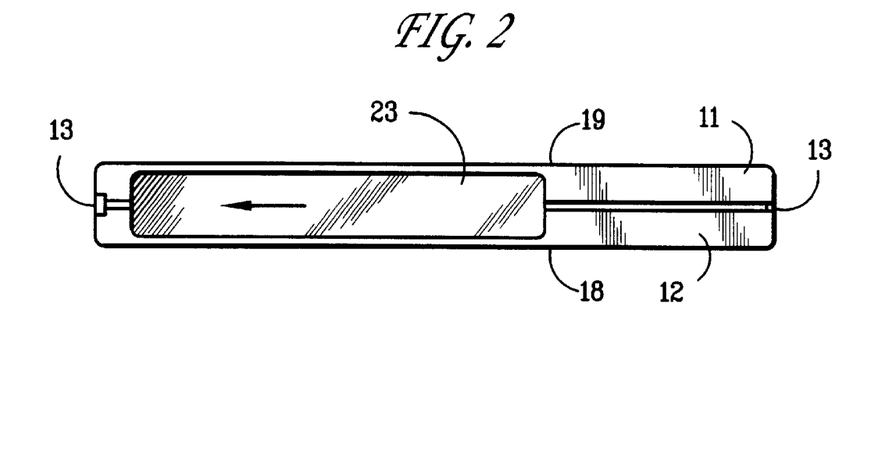
FIG. 2 is a front view of the cartridge.
Figure 3:
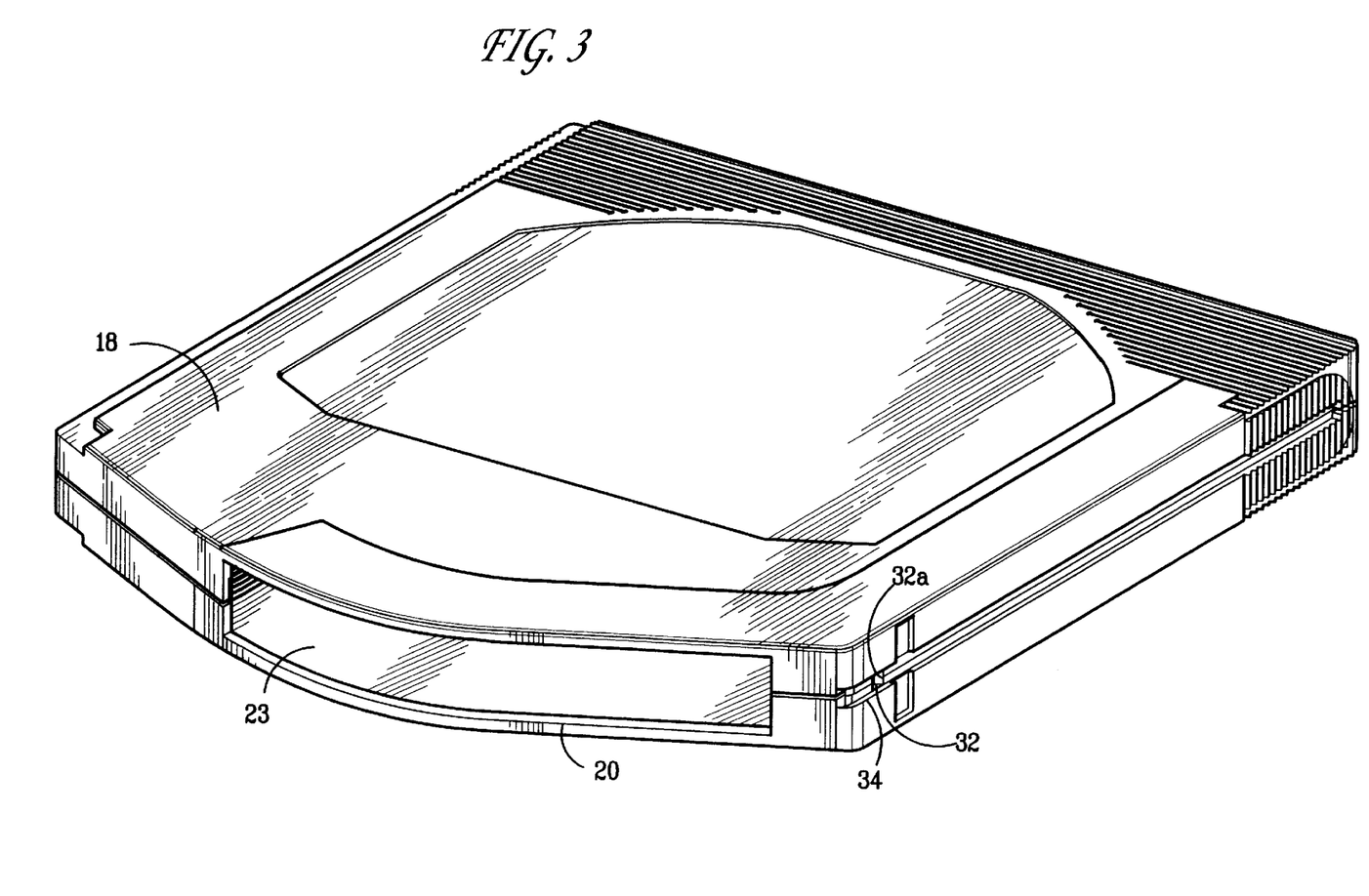
FIG. 3 is an isometric view of the cartridge with the door closed.
Figure 4:
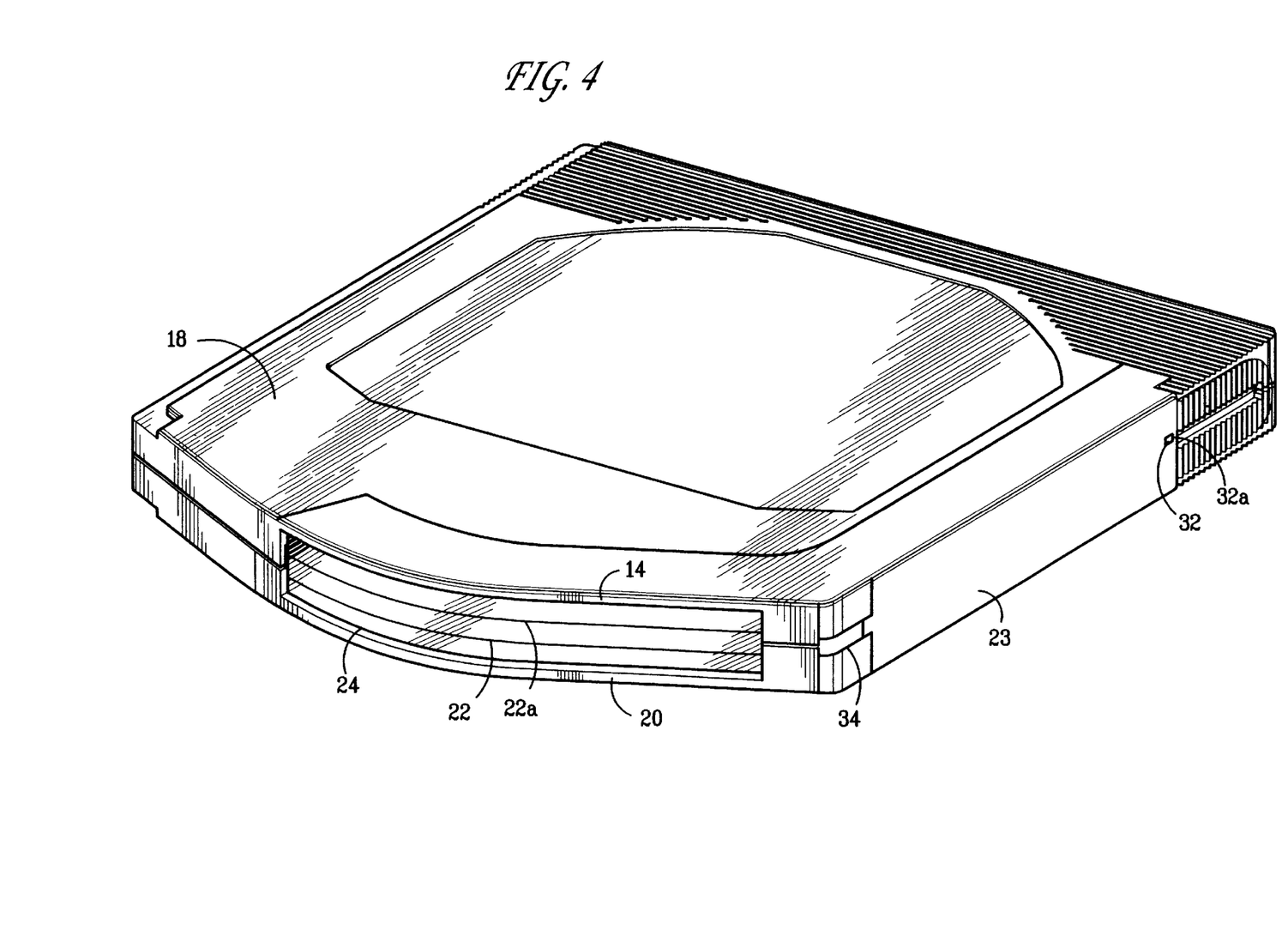
FIG. 4 is an isometric view of the cartridge with the door open.
Figure 5:
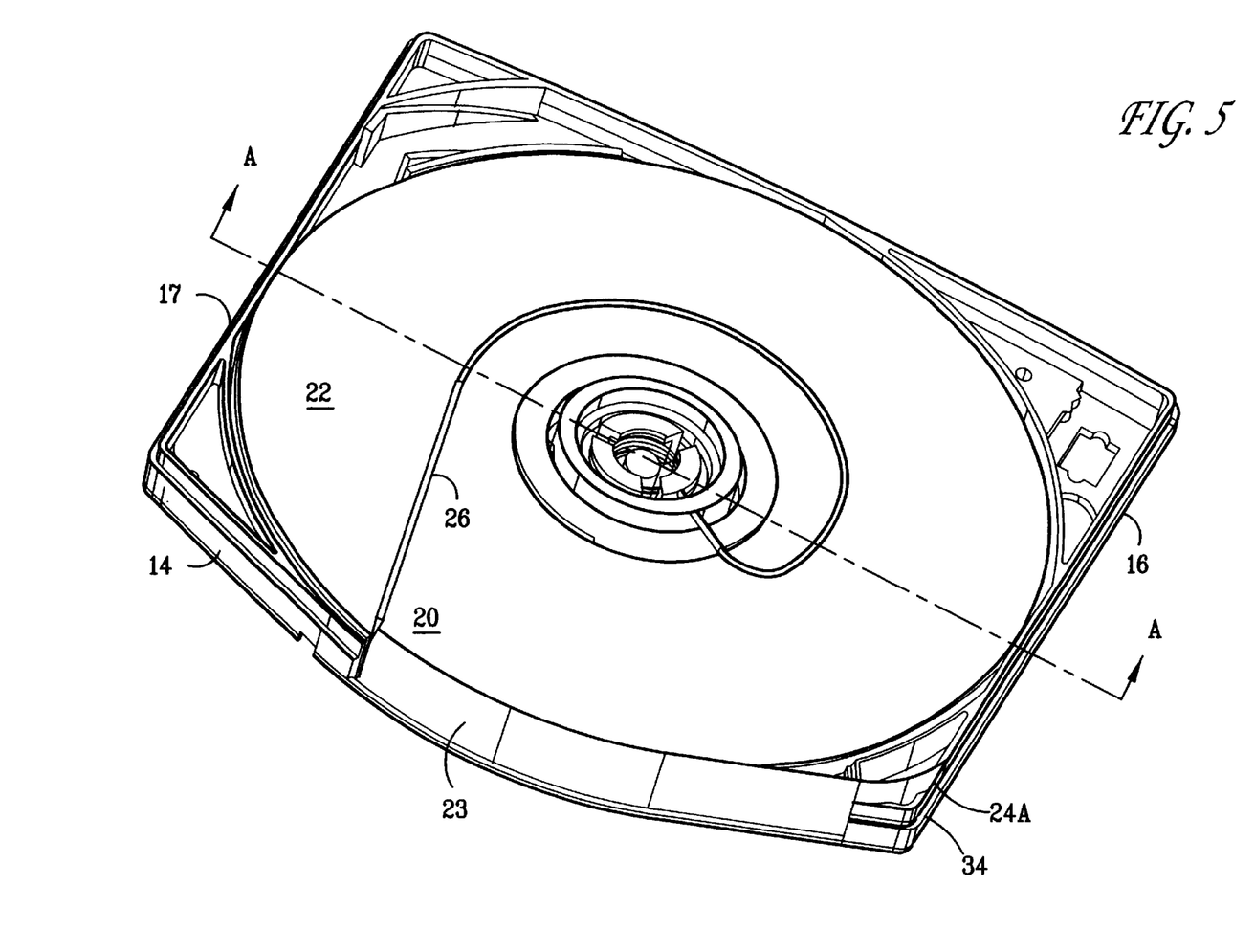
FIG. 5 shows an isometric view of the cartridge with the top shell removed.

13. The cartridge has a front 14, a back 15 and two sides 16 and 17 between substantially flat, planar surfaces 18 and 19. An opening 20 in the front of the cartridge provides access by the read/write heads 21 (FIG. 7) to the recording disks 22, 22A (FIG. 4). A flexible door 23 covers the opening when the cartridge is removed from the drive.

Track 24 and a corresponding track 25 in the top half shell, guide the door outside of the shell when the door is opened. The tracks extend along the front 14 and guide the door to a position along one side 16 of the shell when the door is opened. The flexible door 23 slides in the tracks from a closed position, shown in FIG. 3, in which it covers the opening 20, to the open position as shown in FIG. 4. The door 23 slides along the outside of the shell along the side 16 when the cartridge is inserted into the drive. The spring 26 biases the door into the closed position.

The track has a small radius 28 at the corner between the side 16 and the front of the cartridge. A straight section 29 is between the small radius 28 and the large radius 30 at the front of the cartridge. The door is sufficiently flexible to follow the door tracks around the large radius 30, through the straight section 29, and the small radius 28. The cartridge has straight portions 29a and 29c which form an obtuse angle 29b with side 16 and another obtuse angle 29d with side 17.

The door 23 has a width approximately co-extensive with the width of the shell. The length of door 23 is sufficient to cover the opening 20 in the closed position and short enough to fit along the side 16 of the cartridge when it is in the open position. The length and width of the door are constrained by the form factor of the drive and the size of the recording disks 22 and 22A which occupy most of the interior of the cartridge.

The flexible door 23 has a hole 32 at the end thereof operative portion of door opening member 32a. A projection 38 on the drive catches the hole 32 when the cartridge is inserted into the drive to pull the door to the open position. A groove 34 in the corner of the cartridge guides the projection to the hole 32.

Figure 6:
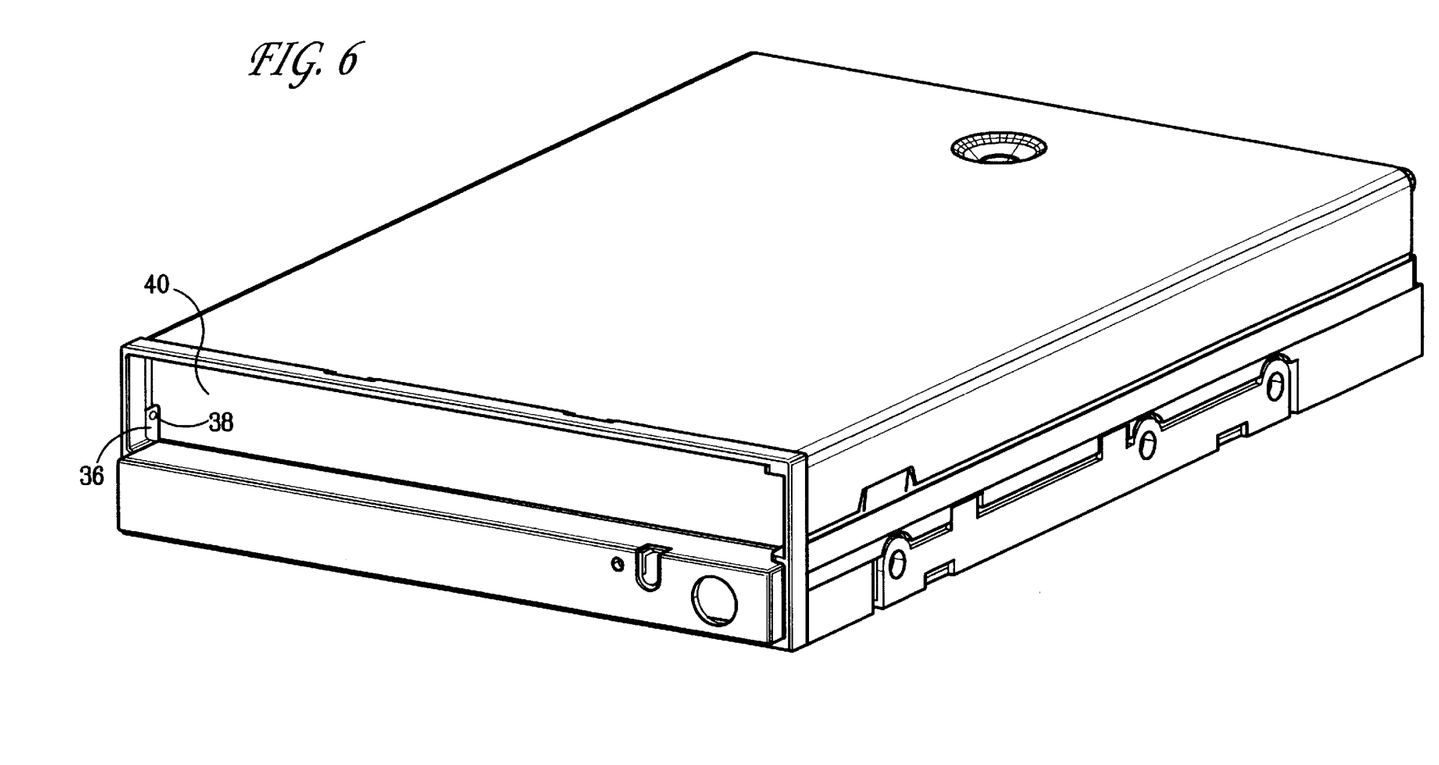
FIG. 6 shows the drive.
Figure 7:
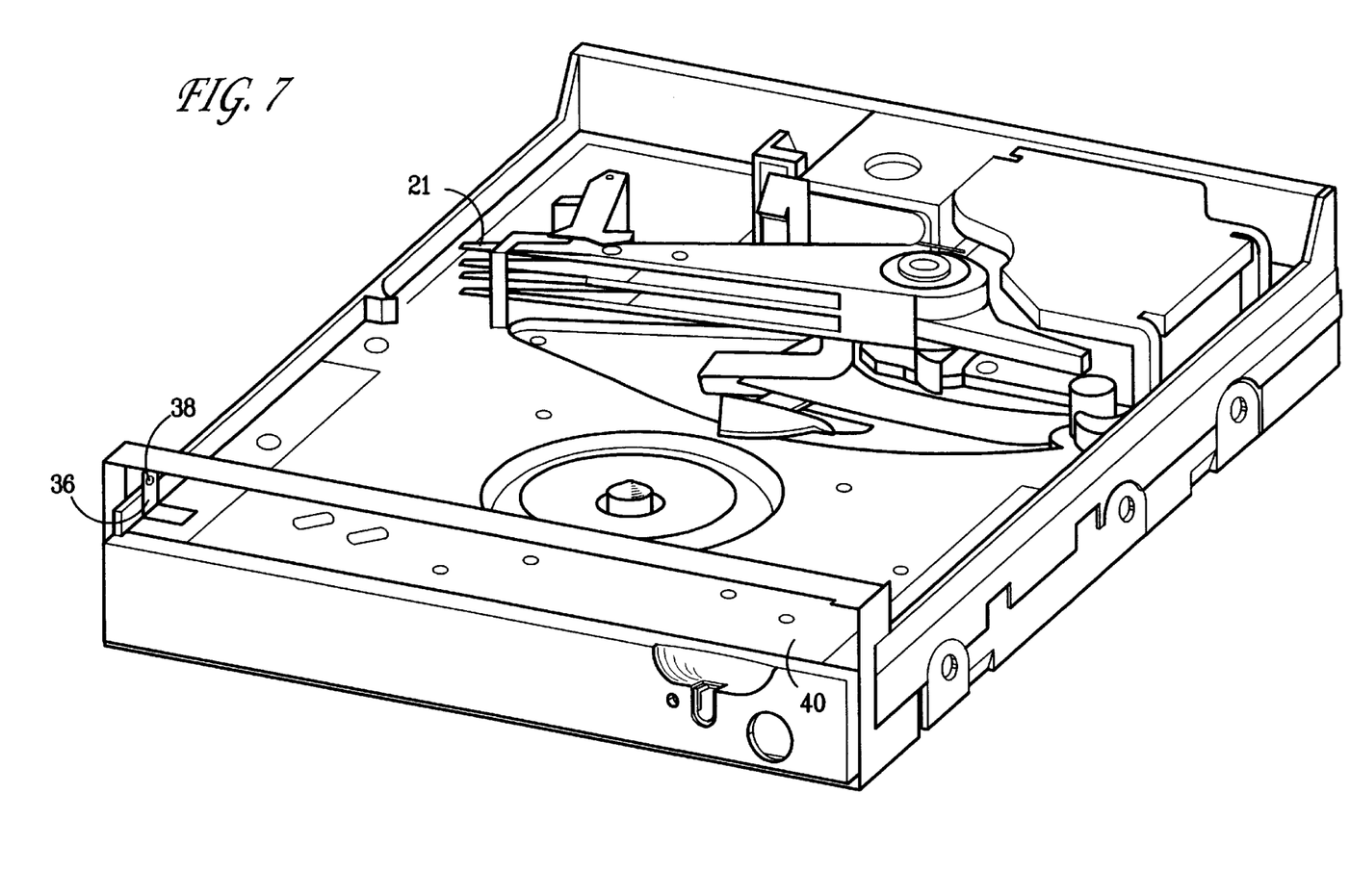
FIG. 7 shows the drive with the cover removed.

FIGS. 6 and 7 show the drive. A projection 38 on the flexible L-shaped arm 36 catches the hole 32 when the cartridge is inserted into the drive.

Figure 8:
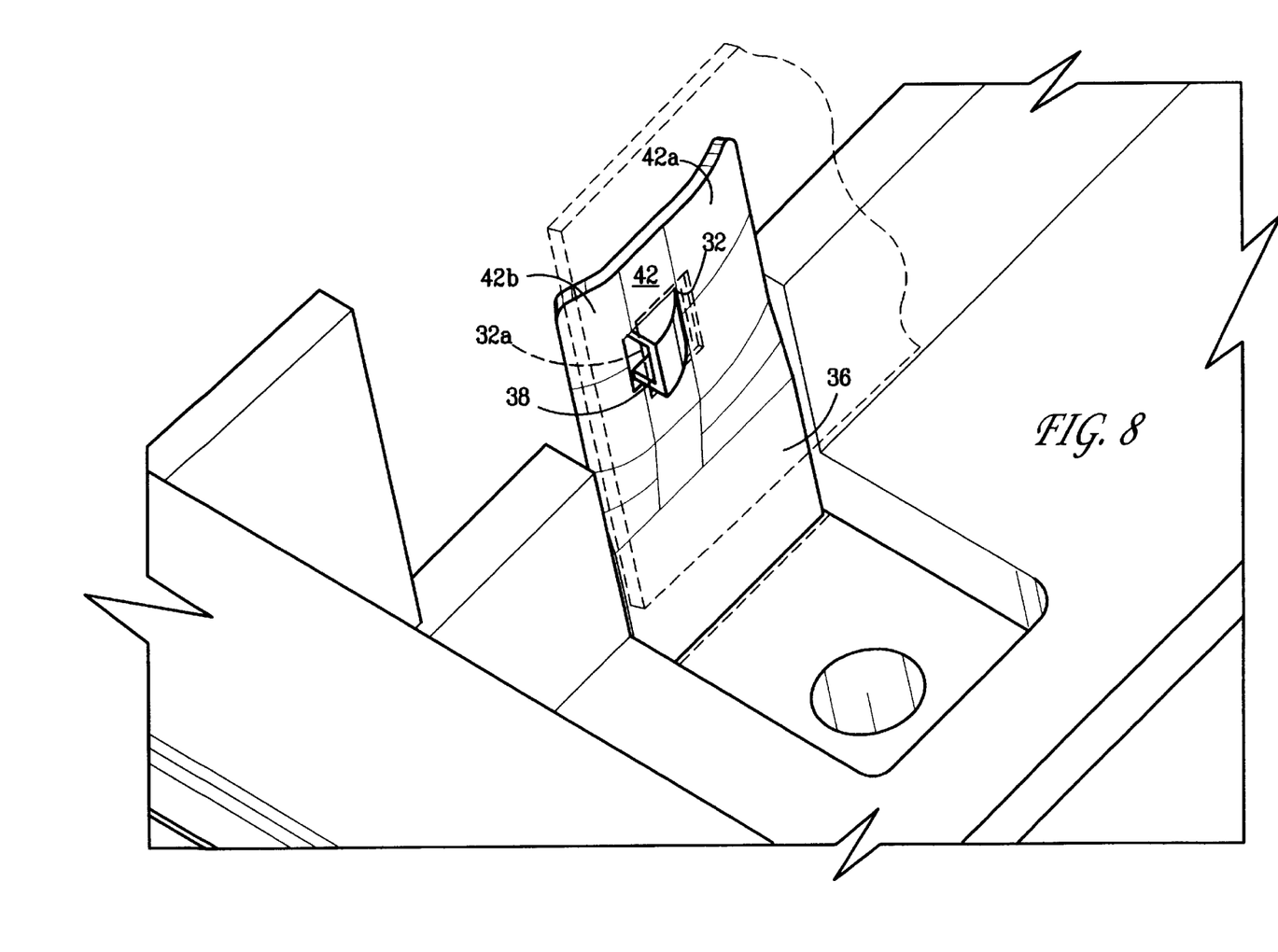
FIG. 8 shows the projection which opens the door.
Figures 9A, 9B, 9C:
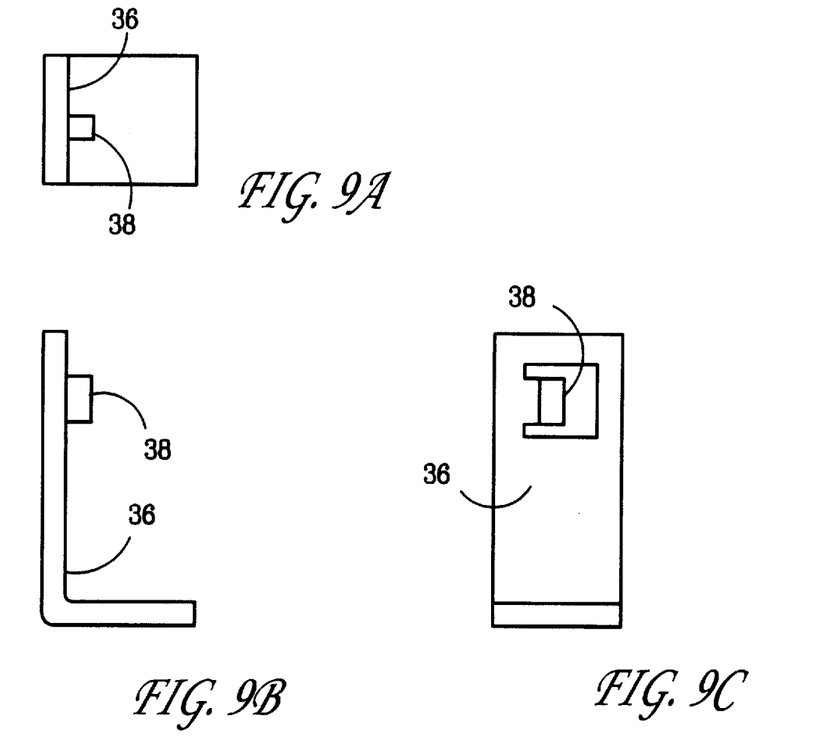
FIGS. 9A–9C are top, front and right side view of the projection.
Figure 10:
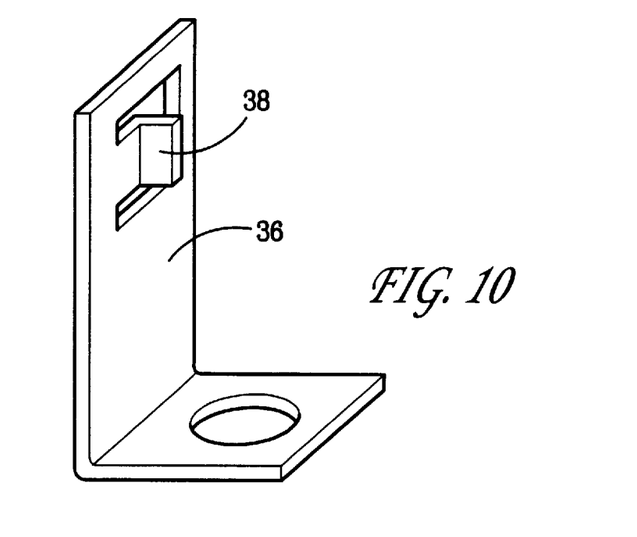
FIG. 10 is an isometric view of the projection.
Figure 11:
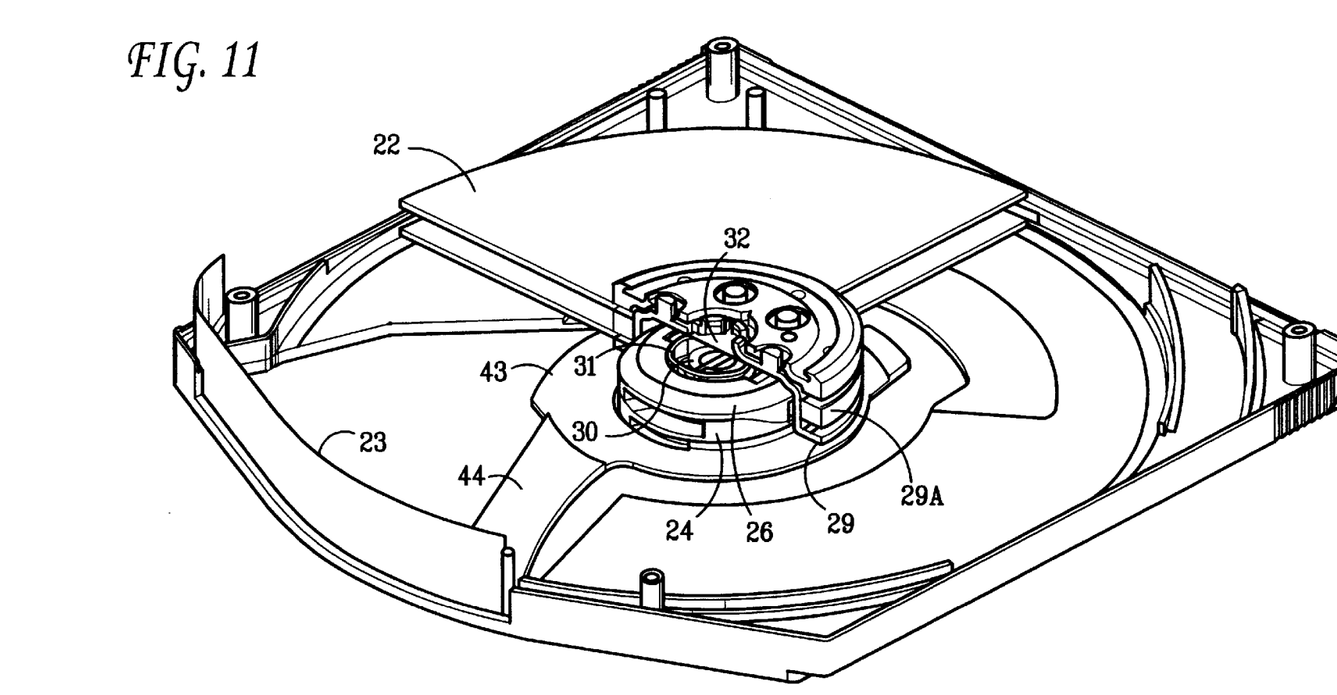
FIG. 11 is a broken away perspective view of a preferred embodiment of the invention with the door in the closed position.
Figure 12:
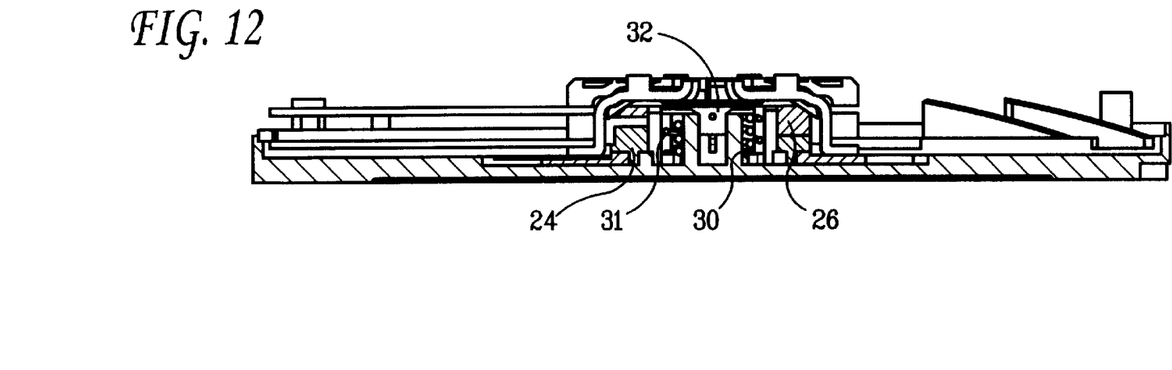
FIG. 12 is a cross-section of the cartridge of FIG. 11.
Figure 13:
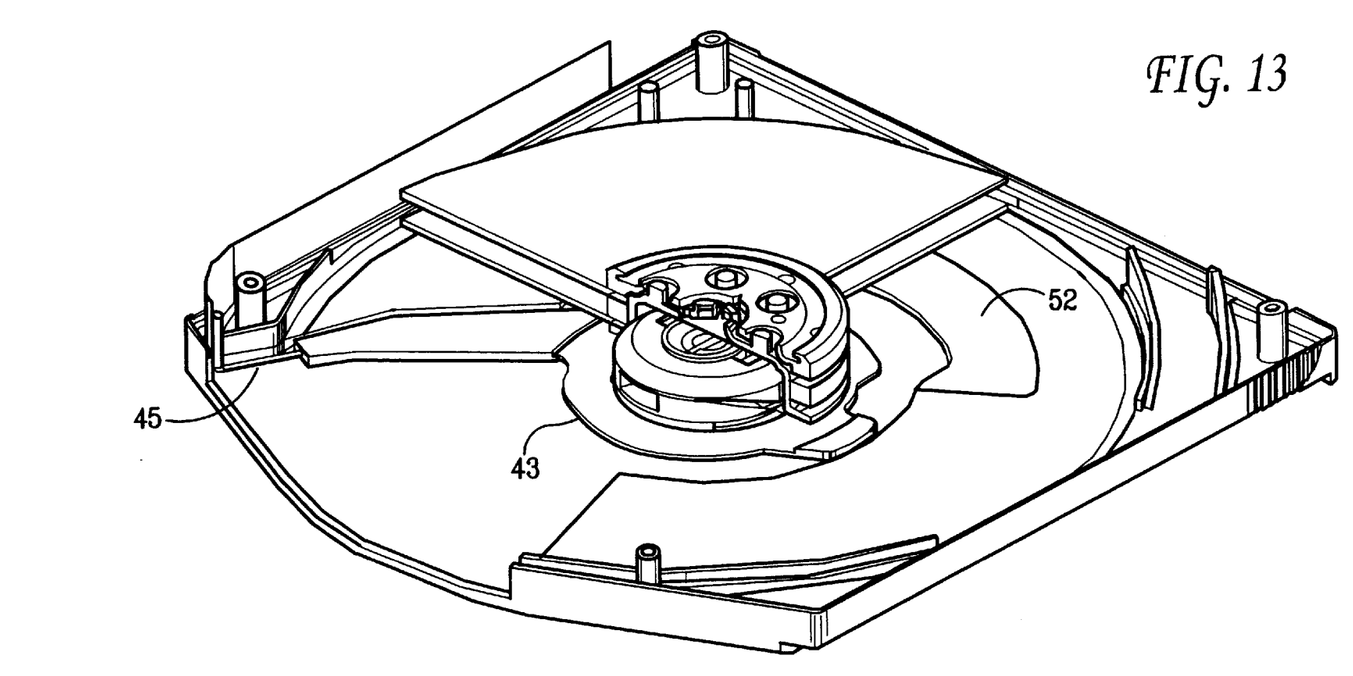
FIG. 13 is a broken-away perspective view of the cartridge of the preferred embodiment with the door in the open position.
Figure 14:
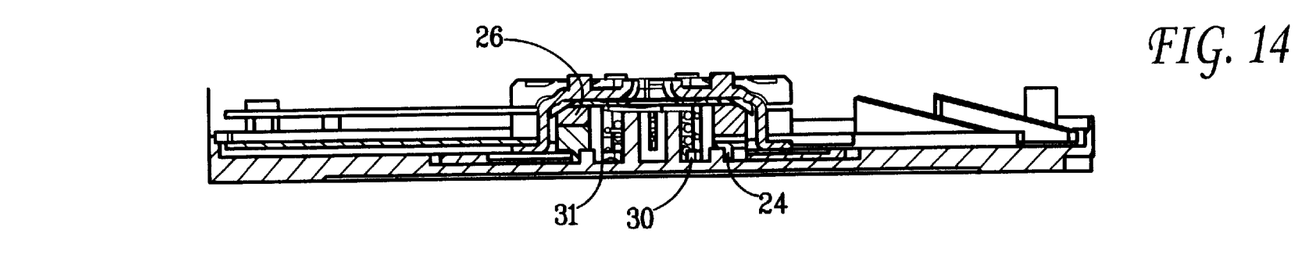
FIG. 14 is a cross-section of the cartridge of FIG. 13.
Figure 15:
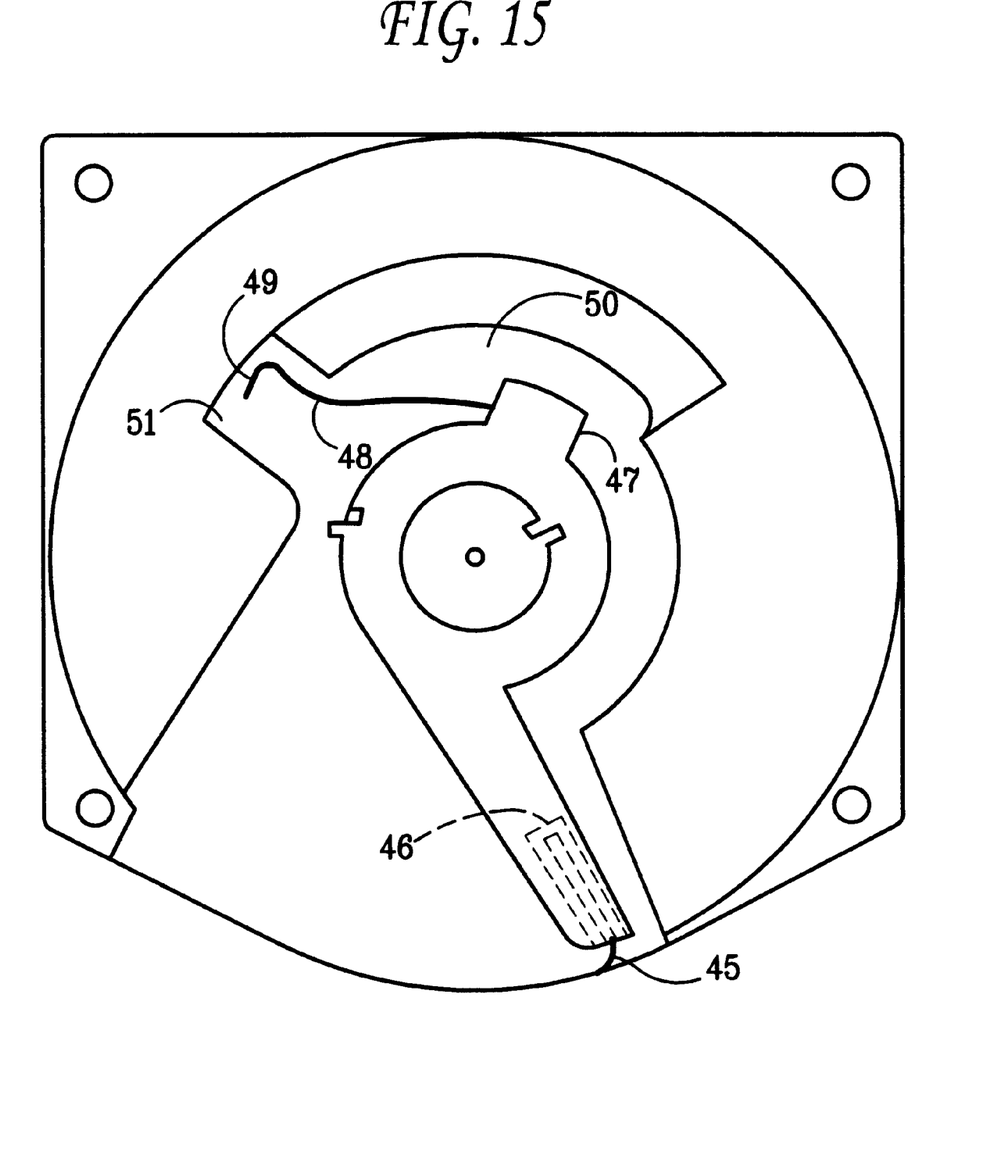
FIG. 15 is a top-plan view of the cartridge with the top shell and disks removed.

FIG. 8 shows the projection 38 in more detail. Special features 42 include curved surfaces 42a and 42b around the projection 38. These surfaces control the penetration of the projection 38 into the groove 34 along the cartridge side. This ensure proper engagement of the projection 38 and hole 32.

FIGS. 9A–C and 10 show, top, front, side and isometric views, respectively of the flexible arm 36 on which the projection 38 is mounted. The flexibility of arm 36 ensures that the projection 38 will catch the hole 32 in the door no matter where the cartridge is located in the slot 40 in the drive. This variation in cartridge location is caused by normal manufacturing tolerances.

FIGS. 11–15 show a preferred embodiment of the invention in which the connection between the clamping mechanism and the door is a member 43 which is rotatable about the axis of the disks. Rotatable member 43 has an arm 44 extending radially toward the door 23. The terminal end of arm 44 is connected to the door by the wire 45, FIG. 15. Wire 45 is disposed in an opening 46 in the arm. The wire telescopes into and out of the opening 46 as the door travels through its stroke. This accommodates the varying radial distance to the door throughout its stroke.

A protrusion 47 on the arm has a spring 48 which provides the closing force needed to close the door through the last portion of its travel. The spring 48 has a bent end 49 which travels in the arcuate path 50. The arcuate path has a notch 51 at the closing end thereof. As the bent end 41 travels along arcuate path 50, it drops into the notch 51 at the closing end of the door stroke. This provides the extra force necessary to close the door.

Arcuate path 50 is a depression in the face of the cartridge. This depression has a cover 52 so that the spring 48, and its bent end 49 travel in a closed path.

Other embodiments are within the true spirit and scope of the invention. The appended claims, are therefore, intended to cover all such embodiments.

What is claimed is:

1. A cartridge for use in a disk drive, the disk drive including a read/write head for reading and recording information, the disk drive defining an opening permitting the cartridge to be inserted into the disk drive, the cartridge comprising:

a shell having a front edge, a back edge, and two side edges, the front edge having a first straight portion, a second straight portion, and a center portion disposed between the first straight portion and the second straight portion, the first straight portion forming a first obtuse angle with one of the two side edges, the second straight portion forming a second obtuse angle with another one of the two side edges said two side edges being substantially planar, the shell defining a first opening in the front edge, the shell defining a second opening proximal a junction of one of said side edges and said front edge, the shell defining a recess, the recess extending in a direction substantially parallel to the two side edges;

a rotatable recording medium in said shell upon which information may be written or read;

a door movable between an open position and a closed position, the door covering said first opening when the door is in said closed position, the door not covering at least a portion of said first opening when the door is in said open position and thereby permitting said read/write head to access the recording medium when the door is in said open position and when the cartridge is inserted into the disk drive; and a door opening member coupled to said door, said door opening member being movable relative to said shell between a first position and a second position, said door being in said closed position when said door opening member is in said first position, said door being in said open position when said door opening member is in said second position, an operative portion of the door opening member being disposed proximal the second opening when the door opening member is in the first position a projection of the drive engaging the operative portion of said door opening member when the cartridge is inserted into the drive and moving said door opening member parallel to the two side edges and along the recess from said first position to said second position as the cartridge is inserted into the drive.

2. The cartridge recited in claim 1 wherein said recess guides said projection to said operative portion of said door opening member.

3. The cartridge recited in claim 1 wherein the operative portion of the door opening member moves outside of the cartridge along said one side edge as the cartridge is inserted into the drive.

4. The cartridge recited in claim 1 wherein said shell is rigid.

5. The cartridge recited in claim wherein the center portion comprises a curve in the middle of said front edge.

6. The cartridge recited in claim 1 wherein said shell comprises two portions joined along said front, back and two side edges.

7. The cartridge recited in claim 1 wherein said door has a width approximately co-extensive with the width of said shell.

8. The cartridge recited in claim 1 further comprising:

a member rotatable about the axis of said recording medium, said member being connected to said door; and a spring connected to said member for urging said door toward said closed position when said cartridge is removed from said drive.

9. The cartridge recited in claim 8 further comprising:
a protrusion on said member; and
an arcuate path for said spring, said spring having a bent end, said bent end traveling in said arcuate path as said door moves from the open to the closed position.

10. The cartridge recited in claim 9 further comprising:
a notch at the end of said arcuate path, said bent end of said spring traveling into said notch to provide the force to close said door through the last portion of travel of said door to its closed position.

11. The cartridge recited in claim 9 further comprising:
a cover for said arcuate path, said spring traveling in the covered arcuate path as said door moves between the open and the closed position.

12. The cartridge recited in claim 1, wherein said shell includes a top surface and a bottom surface, at least a portion of the front edge, the back edge, and the two side edges disposed substantially between the top surface and the bottom surface, each one of the top surface and the bottom surface being symmetrical about a plane bisecting said shell at a midpoint between the two side edges, and extending parallel to said side edges and perpendicular to the substantially flat planar surfaces of said shell.

13. The cartridge recited in claim 1 wherein the first obtuse angle and the second obtuse angle have substantially the same magnitude and the center portion is substantially equidistant from each one of the two side edges.

14. The cartridge recited in claim 1 wherein the shell includes an extended portion that is defined by the first straight portion, the second straight portion, the center portion, a portion of a top surface of the shell, and a portion of a bottom surface of the shell, the extended portion housing a portion of the recording medium.

15. The cartridge recited in claim 1 wherein the recess comprises a groove that guides the projection to the operative portion of the door opening member.

16. The cartridge recited in claim 15 wherein the groove is formed on the one side edge of the cartridge.

17. The cartridge recited in claim 1 wherein the door opening member is connected to the door.

18. The cartridge recited in claim 1 wherein at least a portion of the operative portion of the door opening member is exposed through the second opening.

19. The cartridge recited in claim 1 wherein the operative portion of the door opening member is a catch.

20. A cartridge for use in a disk drive, the disk drive including a read/write head for reading and recording information, the disk drive defining an opening permitting the cartridge to be inserted into the disk drive, the cartridge comprising:
a shell having a front edge, a back edge, and two side edges, said shell having an extended portion proximate the front edge that protrudes outwardly from the side edges of said shell, said two side edges being substantially planar, the front edge defining a first opening, the shell defining a second opening proximal a junction of one of said side edges and said front edge;
a rotatable recording medium in said shell upon which information may be written or read;
a door movable between an open position and a closed position, the door covering said first opening when the door is in said closed position, the door not covering at least a portion of said first opening when the door is in said open position and thereby permitting said read/write head to access the recording medium when the door is in said open position and when the cartridge is inserted into the disk drive; and
a door opening member coupled to said door, at least a portion of said door opening member being exposed through said second opening, said door opening member being movable relative to said shell between a first position and a second position, said door being in said closed position when said door opening member is in said first position, said door being in said open position when said door opening member is in said second position, a projection of the drive engaging said door opening member when the cartridge is inserted into the drive and moving said door opening member from said first position to said second position as the cartridge is inserted into the drive.

21. The cartridge recited in claim 20 wherein the extended portion includes a first straight portion forming an obtuse angle with one of the two side edges, a second straight portion forming an obtuse angle with another one of the two side edges, and a center portion disposed between the first straight portion and the second straight portion.

22. The cartridge recited in claim 21 wherein a top profile of the cartridge is substantially symmetrical about a plane bisecting said shell at a midpoint between the two side edges, and extending parallel to said side edges and perpendicular to the substantially flat planar surfaces of said shell.

23. The cartridge recited in claim 20 wherein the extended portion houses a portion of the recording medium.

24. The cartridge recited in claim 20 wherein said door opening member is movable substantially parallel to said one side edge as the cartridge is inserted into the drive.

25. The cartridge recited in claim 20 wherein said shell comprises two portions joined along said front, back and two side edges.

26. The cartridge recited in claim 20 wherein said door has a width approximately co-extensive with the width of said shell.

27. The cartridge recited in claim 20 further comprising a recess formed in the shell proximate the second opening parallel to the side edges, the recess capable of cooperating with the projection of the drive.

28. The cartridge recited in claim 27 wherein the recess comprises a groove formed in the shell that guides the projection to the door opening member.

29. The cartridge recited in claim 20 wherein the door opening member is connected to the door.

30. The cartridge recited in claim 29 wherein the door opening member includes a catch formed on the door.

31. A cartridge for use in a disk drive, the disk drive including a read/write head for reading and recording information, the cartridge comprising:
a shell having a front edge, a back edge, and two side edges, the front edge having a first straight portion, a second straight portion, and a center portion disposed between the first straight portion and the second straight portion, the first straight portion forming a first obtuse angle with one of the two side edges, the second straight portion forming a second obtuse angle with another one of the two side edges, said two side edges being substantially planar, the shell defining a first opening in the front edge, the shell defining a second opening proximal a junction of one of said side edges and said front edge, the shell defining a recess, the recess extending in a direction substantially parallel to the two side edges;

a rotatable recording medium in said shell upon which information may be written or read, the recording medium disposed in the shell between the top surface and the bottom surface, a portion of the recording medium disposed in an extended portion of the shell that is defined by the first straight portion, the second straight portion, the center portion, a portion of the top surface of the shell, and a portion of the bottom surface of the shell;

a door movable between an open position and a closed position, the door covering said first opening when the door is in said closed position, the door not covering at least a portion of said first opening when the door is in said open position and thereby permitting said read/write head to access the recording medium when the door is in said open position and when the cartridge is inserted into the disk drive; and a door opening member coupled to said door, said door opening member being movable relative to said shell between a first position and a second position, said door being in said closed position when said door opening member is in said first position, said door being in said open position when said door opening member is in said second position, an operative portion of the door opening member being disposed proximal the second opening when the door opening member is in the first position, a projection of the drive engaging the operative portion of said door opening member when the cartridge is inserted into the drive and moving said door opening member parallel to the two side edges and along the recess from said first position to said second position as the cartridge is inserted into the drive.

32. The cartridge recited in claim 31 wherein each one of the top surface and the bottom surface are symmetrical about a plane perpendicular to the top surface and bisect the top surface at a midpoint between the two side edges.

33. The cartridge recited in claim 31 wherein the extended portion includes a convex portion.

34. The cartridge recited in claim 31 wherein the operative portion of the door opening member moves outside of the cartridge.

35. The cartridge recited in claim 31 wherein the operative portion of the door opening member moves along the one side edge as the cartridge is inserted into the drive.

36. The cartridge recited in claim 31 wherein the center portion comprises a curve in the middle of said front edge.

37. The cartridge recited in claim 31 wherein the first obtuse angle and the second obtuse angle have substantially the same magnitude and the center portion is substantially equidistant from each one of the two side edges.

38. The cartridge recited in claim 31 wherein the recess comprises a groove that guides the projection when the cartridge is inserted into the drive.

39. The cartridge recited in claim 37 wherein the groove is formed on the one side edge of the cartridge.

40. The cartridge recited in claim 31 wherein the door opening member is connected to the door.

41. The cartridge recited in claim 31 wherein at least a portion of the operative portion of the door opening member is exposed through the second opening.

42. The cartridge recited in claim 31 wherein the operative portion of the door opening member is a catch.

* * * * *